US012612804B2

(12) United States Patent
Holst-Larsen et al.

(10) Patent No.: US 12,612,804 B2
(45) Date of Patent: Apr. 28, 2026

(54) LOCK DEVICE AND SYSTEM

(71) Applicant: ASSA ABLOY AB, Stockholm (SE)

(72) Inventors: Erik Holst-Larsen, Oslo (NO); Harald Vestøl, Kolbotn (NO); Bjørn Kolstad, Råde (NO); Erlend Omvik, Skotbu (NO)

(73) Assignee: ASSA ABLOY AB, Stockholm (SE)

( * ) Notice: Subject to any disclaimer, the term of this patent is extended or adjusted under 35 U.S.C. 154(b) by 533 days.

(21) Appl. No.: 17/761,750

(22) PCT Filed: Sep. 3, 2020

(86) PCT No.: PCT/EP2020/074589
§ 371 (c)(1),
(2) Date: Mar. 18, 2022

(87) PCT Pub. No.: WO2021/058253
PCT Pub. Date: Apr. 1, 2021

(65) Prior Publication Data

US 2022/0372794 A1 Nov. 24, 2022

(30) Foreign Application Priority Data

Sep. 26, 2019 (SE) .................................... 1951087-4

(51) Int. Cl.
*E05B 47/00* (2006.01)
*E05B 63/20* (2006.01)

(52) U.S. Cl.
CPC ...... *E05B 47/0046* (2013.01); *E05B 47/0038* (2013.01); *E05B 63/20* (2013.01)

(58) Field of Classification Search
CPC ...... E05C 17/56; E05B 47/0046; E05B 47/06; E05B 47/0607; E05B 47/0038;
(Continued)

(56) References Cited

U.S. PATENT DOCUMENTS 4,656,850 A 4/1987 Tabata
5,377,513 A * 1/1995 Miyamoto .......... E05B 47/0607 70/276

(Continued)

FOREIGN PATENT DOCUMENTS

CN 205840551 12/2016
CN 107956320 4/2018

(Continued)

OTHER PUBLICATIONS

Official Action with English Translation for China Patent Application No. 202080067944.4, dated Feb. 27, 2023, 11 pages.

(Continued)

*Primary Examiner* — Christine M Mills
*Assistant Examiner* — Yahya Sidky
(74) *Attorney, Agent, or Firm* — Schwegman Lundberg & Woessner, P.A.

(57) ABSTRACT

A lock device (12) comprising a bolt (22) movable between a retracted position (24) and an extended position (90); a bolt force device (26) arranged to force the bolt (22) from the retracted position (24) towards the extended position (90); a blocking member (28) movable between a blocking position (32) and an unblocking position (96); a lock device magnet (46) movable between a passive position (48) and an active position (94) in response to a repulsive magnetic force acting on the lock device magnet (46); and a release transmission (52) arranged to mechanically transmit a movement of the lock device magnet (46) from the passive position (48) to the active position (94), to a movement of the blocking member (28) from the blocking position (32) to the unblocking position (96). A system (10) comprising a lock device (12) and a strike plate (14) is also provided.

16 Claims, 6 Drawing Sheets

(58) Field of Classification Search
CPC .... E05B 63/20; Y10T 292/11; Y10T 292/103; Y10T 292/1031; Y10T 292/0969; Y10T 292/0977
See application file for complete search history.

(56) References Cited

U.S. PATENT DOCUMENTS

| | | | |
|---|---|---|---|
| 7,497,486 | B1 | 3/2009 | Davis et al. |
| 2009/0115204 | A1 | 5/2009 | Rycroft |

FOREIGN PATENT DOCUMENTS

| | | | | |
|---|---|---|---|---|
| EP | 3101205 | | 12/2016 | |
| FR | 2713267 | | 6/1995 | |
| FR | 2937990 | | 5/2010 | |
| FR | 2937990 | A1 * | 5/2010 | ......... E05B 47/0038 |
| JP | S59-113448 | | 7/1984 | |
| JP | H03-129074 | | 6/1991 | |
| WO | WO 2014/023786 | | 2/2014 | |
| WO | WO 2017/158449 | | 9/2017 | |

OTHER PUBLICATIONS

Official Action for Sweden Patent Application No. 1951087-4, dated Mar. 19, 2020, 8 pages.

Official Action for Sweden Patent Application No. 1951087-4, dated Aug. 17, 2021, 4 pages.

International Search Report and Written Opinion for International (PCT) Patent Application No. PCT/EP2020/074589, dated Nov. 20, 2020, 10 pages.

Official Action with English Translation for China Patent Application No. 202080067944.4, dated Sep. 23, 2022, 16 pages.

"International Application Serial No. PCT EP2020 074589, Response to Written Opinion filed Mar. 1, 2021 to Written Opinion mailed Nov. 20, 2020", 30 pgs.

"International Application Serial No. PCT EP2020 074589, Response to Written Opinion filed May 7, 2021 to Written Opinion mailed Mar. 10, 2021", 5 pgs.

"International Application Serial No. PCT EP2020 074589, International Preliminary Report on Patentability mailed Sep. 10, 2021", 6 pgs.

"International Application Serial No. PCT EP2020 074589, Written Opinion mailed Mar. 10, 2021", 6 pgs.

* cited by examiner

LOCK DEVICE AND SYSTEM

CROSS REFERENCE TO RELATED APPLICATIONS

This application is a national stage application under 35 U.S.C. 371 and claims the benefit of PCT Application No. PCT/EP2020/074589 having an international filing date of Sep. 3, 2020, which designated the United States, which PCT application claimed the benefit of Sweden Patent Application No. 1951087-4 filed Sep. 26, 2019, the disclosure of each of which are incorporated herein by reference.

TECHNICAL FIELD

The present disclosure generally relates to a lock device. In particular, a lock device for installation in an access member movable relative to a frame, and a system comprising a lock device and a strike plate, are provided.

BACKGROUND

A typical lock case may comprise a latch and a deadbolt. The latch may be retracted by a handle but also allows e.g. a door leaf to be closed without maneuvering the handle. The deadbolt may be operated by a key on one side and by a twist knob on the opposite side. A deadbolt may also be operated electronically. When the deadbolt extends to engage a strike plate in a frame, the door leaf is locked. Lock cases comprising an automatic deadbolt lock are previously known. Such lock cases are however usually based on a conventional latch and deadbolt.

WO 2017158449 A1 discloses an automatic system for closing windows or doors, comprising a counter-plate installable on a fixed frame and provided with a first member that is mobile with respect to the counter-plate. The system further comprises a lock-body installable on a door or window leaf and provided with closing means mobile between a release configuration and a retained configuration. A switch is housed in the lock-body for activating a switching of the closing means at least between the retained configuration and the release configuration. The system comprises a second member solidly fixed to the lock-body so that, when the lock-body is proximal to the counter-plate, the second member exchanges, with the first member, an attraction force of a magnetic type which nears said first member to the lock-body so that it interacts magnetically with the switch for activating the automatic switching of the closing means between the retained configuration and the release configuration, the switch being distinct and separated from said second member.

SUMMARY

One object of the present disclosure is to provide a lock device for installation in an access member, which lock device has a reliable operation.

A further object of the present disclosure is to provide a lock device for installation in an access member, which lock device has simple design, e.g. requiring few parts.

A still further object of the present disclosure is to provide a lock device for installation in an access member, which lock device has a smooth operation.

A still further object of the present disclosure is to provide a lock device for installation in an access member, which lock device has an energy efficient operation, e.g. with low friction losses.

A still further object of the present disclosure is to provide a lock device for installation in an access member, which lock device has a silent operation, e.g. a quiet closing of the access member.

A still further object of the present disclosure is to provide a lock device for installation in an access member, which lock device has few moving parts.

A still further object of the present disclosure is to provide a lock device for installation in an access member, which lock device is subjected to low wear.

A still further object of the present disclosure is to provide a lock device for installation in an access member, which lock device is cost-effective.

A still further object of the present disclosure is to provide a lock device for installation in an access member, which lock device enables a reduction of tolerances of the lock device, the access member, a strike plate and/or a frame.

A still further object of the present disclosure is to provide a lock device for installation in an access member, which lock device enables an automatic latching of the access member with a low closing force of the access member.

A still further object of the present disclosure is to provide a lock device for installation in an access member, which lock device enables a high speed release of a bolt into a strike plate.

A still further object of the present disclosure is to provide a lock device for installation in an access member, which lock device is durable.

A still further object of the present disclosure is to provide a more generic a lock device for installation in an access member, i.e. a lock device that enables a number of configurations in production to be reduced.

A still further object of the present disclosure is to provide a lock device for installation in an access member, which lock device solves several or all of the foregoing objects in combination.

A still further object of the present disclosure is to provide a system comprising a lock device and a strike plate, which system solves one, several or all of the foregoing objects.

According to one aspect, there is provided a lock device for installation in an access member movable relative to a frame, the lock device comprising a bolt movable between a retracted position for disengagement from a strike plate in the frame, and an extended position for engagement with the strike plate; a bolt force device arranged to force the bolt from the retracted position towards the extended position; a blocking member movable between a blocking position where movement of the bolt from the retracted position towards the extended position is blocked by the blocking member, and an unblocking position where movement of the bolt from the retracted position towards the extended position is not blocked by the blocking member; a lock device magnet movable between a passive position and an active position in response to a repulsive magnetic force acting on the lock device magnet; and a release transmission arranged to mechanically transmit a movement of the lock device magnet from the passive position to the active position, to a movement of the blocking member from the blocking position to the unblocking position.

The lock device enables the bolt to be released automatically when the access member is aligned with the frame, e.g. when a door leaf or window leaf is closed. The bolt is triggered to move to the extended position and engage the strike plate in response to the repulsive magnetic force acting on the lock device magnet. The repulsive magnetic force may for example be generated by means of cooperation between the lock device magnet and a strike plate magnet in the strike plate when the lock device is aligned with the strike plate, e.g. when a door leaf is closed. The lock device is thus an automatic lock device. The bolt may be mechanically and magnetically triggered, without electronics.

The lock device enables a high speed and automatic release of the bolt into the strike plate. The bolt therefore functions as a conventional latch, enabling the access member to stay in the frame and making the access member completely deadbolted in one operation, without a separate deadbolt. Due to the functioning of the bolt as a conventional latch, the bolt will never block the access member from being closed, unless the lock device magnet is manipulated by magnetic force in an open position of the access member. However, should such manipulation occur and the bolt is released, the bolt can be moved from the extended position back to the retracted position by turning a handle.

When an access member comprising the lock device is open, i.e. not in the frame, the bolt is retracted. Thus, when an access member comprising the lock device is open, e.g. such that the lock device is distanced from the strike plate in a frame and no repulsive magnetic force acts on the lock device magnet, the bolt adopts the retracted position. In the retracted position, the bolt may be entirely inside the lock device.

When the access member moves towards the frame, no parts may protrude from the lock device. Slightly before the access member becomes aligned with the frame, the repulsive magnetic force (e.g. generated in combination by a strike plate magnet and the lock device magnet) appears. In this way, the lock device enables the bolt to be triggered, i.e. released from the retracted position towards the extended position, slightly before the access member becomes aligned with the frame. Due to the bolt force device arranged to force the bolt towards the extended position, an early release of the bolt is possible. Just before the access member is fully aligned with the frame, the bolt may be released to push against a side of the strike plate. The bolt then slides into a strike opening of the strike plate when the access member becomes fully aligned with the frame. Thus, the lock device does not require the access member to be perfectly aligned with the frame in order to release the bolt.

Except movement of the access member, the lock device enables the bolt to be triggered without requiring movements of any parts outside the lock device and without requiring any mechanical contact between the lock device and the strike plate. For example, no latch has to be pushed in by the strike plate in order to trigger release of the bolt. The lock device thus has a simple design, a reliable operation and few moving parts.

The lock device may comprise only one member, i.e. the bolt, arranged to protrudingly engage with the strike plate (e.g. entering a strike opening of the strike plate). For this reason, the lock device may be referred to as a single bolt lock device. For example, the lock device may be a lock case comprising a forend and only one member, i.e. the bolt, may be arranged to protrude beyond the forend. As an alternative, the lock device may further comprise a latch or wheel for sensing purposes, e.g. for sensing when the access member is aligned with the frame. Except for the bolt, the lock device according to the present disclosure may not comprise any latch for protrudingly engaging with the strike plate. When the lock device comprises only the bolt for protrudingly engaging with the strike plate, rather than both a conventional deadbolt and a conventional latch, a latch with a specific handing can be avoided. With handing is meant whether an inclined surface of the latch is facing to an inside or to an outside of the access member (i.e. left handing or right handing). Furthermore, there may no longer be any reason to produce both "deadbolt above" (the latch) and "deadbolt below" (the latch) configurations of the lock device. Thereby, the number of configurations of the lock device can be reduced, which facilitates production.

Furthermore, the single bolt lock device according to the present disclosure, without a conventional latch, will prevent the issues with doors (or other access members) not closing due to wear and tear between the latch and the strike plate. Conventional latches sometimes get stuck and prevent the doors from being closed properly, e.g. by a door pump.

The access member may for example be a door leaf or a window leaf. Throughout the present disclosure, the bolt may be a deadbolt and/or the lock device may be a lock case. The lock device may thus constitute an automatic single bolt lock case.

The bolt force device may comprise a spring, for example a torsion spring. The bolt and the bolt force device may be arranged such that in the retracted position, the bolt is preloaded towards the extended position. As long as the blocking member is in the blocking position, the blocking member holds the bolt in the retracted position. When the blocking member adopts the unblocking position, the bolt is released and the bolt force device forces the bolt from the retracted position towards the extended position. The blocking member may be in contact with the bolt in the blocking position, and separated from the bolt in the unblocking position. By complete disengagement between the blocking member and the bolt in the blocking position, the frictional losses can be reduced.

The lock device magnet may be integrated in the lock device. In the passive position, the lock device magnet may be close to an outer end of the lock device, e.g. close to a forend of a lock case, or close to an outer side of a housing inserted into the forend. The lock device magnet may be covered by a lock device blocking layer, e.g. of plastic material. In the passive position, the lock device magnet may rest against this lock device blocking layer. The lock device blocking layer may be constituted by, or be provided in, a forend. Alternatively, or in addition, the lock device blocking layer may be provided in a housing containing the release transmission. In any case, a distance from the lock device magnet (in the passive position) to the exterior of the lock device may be less than 2 mm, such as 1.5 mm or less, such as 1 mm or less.

The lock device magnet may be linearly guided between the passive position and the active position. To this end, the lock device may comprise a cylinder and the lock device magnet may be a piston travelling in the cylinder. The cylinder may be a cylindrical portion of a housing containing the release transmission. The housing may be made of plastic.

The lock device magnet may be arranged to push on the release transmission when moving from the passive position to the active position. Alternatively, or in addition, the lock device magnet may be connected to the release transmission. The lock device magnet may be a permanent magnet, for example comprising a Neodymium alloy.

The release transmission may comprise a linkage. With linkage is meant any combination of links, sliders, pivots and rotating members forming a mechanism that produces a desired motion. Alternatively, or in addition, the release transmission may be arranged to purely mechanically transmit a movement of the lock device magnet from the passive position to the active position to a movement of the blocking member from the blocking position to the unblocking position, e.g. without involving any electronics. The release transmission may be connected to the blocking member.

The lock device may further comprise at least one handle, e.g. one handle connected to each side of the lock device. Each handle may for example be a lever or a knob. Each handle may be arranged to maneuver the bolt from the extended position to the retracted position. By means of the automatic latching and deadbolting performed by the release of the bolt, the handle does not have to be maneuvered when closing the access member.

The bolt may be arranged to move substantially linearly, or linearly, between the retracted position and the extended position. Alternatively, the lock device magnet may be arranged to move substantially linearly, or linearly, between the passive position and the active position. The bolt and the lock device magnet may be arranged to move linearly and in parallel, e.g. in a horizontal direction.

The release transmission may comprise a knee joint having a knee joint pivot, and a first link member and a second link member interconnected via the knee joint pivot. In this case, the lock device magnet may be arranged to act on the knee joint such that movement of the lock device magnet from the passive position to the active position causes a movement of the knee joint pivot. The knee joint enables relatively high mechanical forces to be generated by the movement of the lock device magnet from the passive position to the active position. A movement of the lock device magnet from the passive position to the active position may cause an angle between the first link member and the second link member to become more acute.

The lock device magnet may for example be arranged to act on the first link member. In the passive position of the lock device magnet, an angle between the first link member and the second link member may be less than 45°, such as less than 30°. Alternatively, or in addition, the knee joint pivot may be substantially aligned with, or aligned with, a linear movement direction of the lock device magnet from the passive position towards the active position. That is, at the start of movement of the lock device magnet from the passive position, the knee joint pivot may be substantially aligned with, or aligned with, the linear movement direction of the lock device magnet. In this way, the kinetic energy of the lock device magnet can be effectively captured and transmitted to the blocking member.

The second link member may be connected to the blocking member. For example, the second link member may be rotationally coupled to the blocking member. Movement of the blocking member from the unblocking position to the blocking position can thereby be transferred by means of the release transmission to a movement of the lock device magnet from the active position to the passive position. For example, movement of the blocking member from the unblocking position to the blocking position may cause the release transmission to push the lock device magnet from the active position back to the passive position.

The lock device may further comprise a blocking member pivot. In this case, the blocking member may be rotatably connected to the blocking member pivot for rotation between the blocking position and the unblocking position. In case the bolt is arranged to move in a horizontal movement direction between the retracted position and the extended position, the blocking member may be arranged to rotate about a horizontal axis that is perpendicular to the horizontal movement direction of the bolt.

The lock device may further comprise a blocking member force device arranged to force the blocking member against the bolt for blocking the bolt. The blocking member force device may comprise a spring, for example a torsion spring.

The blocking member force device may thus be arranged to force the blocking member from the unblocking position to the blocking position. However, as long as the repulsive magnetic force acts on the lock device magnet, the lock device magnet will be forced to the active position against the force of the blocking member force device. Thus, a system comprising the lock device and the strike plate may be configured such that the repulsive magnetic force acting on the lock device magnet is higher than the force from the blocking member force device acting on the lock device magnet, e.g. via the blocking member and the release transmission. When the access member is not aligned with the frame, the repulsive magnetic force will cease. The force from the blocking member force device may then force the lock device magnet to the passive position.

The bolt may comprise an engageable structure, and the blocking member may comprise an engaging structure arranged to engage the engageable structure for blocking the bolt. When the blocking member adopts the blocking position, the engageable structure and the engaging structure may allow movement of the bolt towards the retracted position and prevent movement of the bolt towards the extended position.

The engageable structure may comprise teeth. The engaging structure and the engaging structure may thus form a ratchet mechanism.

The lock device may further comprise a configurable hub operatively connected to the bolt, the configurable hub being arranged to configure a locked side and an unlocked side of the lock device. When the lock device comprises the configurable hub, there is no longer any reason to produce different left hand lock devices and right hand lock devices. Thereby, the number of configurations of the lock device can be reduced, which facilitates production.

The configurable hub may comprise an intermediate member, an outer member, an inner member and an attachment element selectively attachable to the intermediate member from either side of the lock device through either the outer member or the inner member to configure the locked side and the unlocked side of the lock device. When the attachment element is inserted into the outer member and the intermediate member, the inner side of the lock device is locked and the outer side of the lock device is unlocked. Conversely, when the attachment element is inserted into the inner member and the intermediate member, the outer side of the lock device is locked and the inner side of the lock device is unlocked.

The lock device may further comprise an arm having a guiding member. In this case, the bolt may comprise a guiding structure and the guiding member may be arranged to travel in the guiding structure such that a movement of the arm generates a movement of the bolt.

Thus, the lock device may comprise two different force paths to the bolt. A first force path is established by the lock device magnet, the release transmission and the blocking member engaging the bolt. A second force path is established by the arm having the guiding member engaging the guiding structure of the bolt. The arm in turn can be manipulated by a handle, e.g. via any of the inner member and outer member, and may also be forced by the bolt force device.

The bolt force device may be arranged to exert a torque on the arm. By means of the engagement between the guiding member of the arm and the guiding structure of the bolt, a rotational torque exerted on the arm by means of the bolt force device can be transferred to a movement (if the blocking member adopts the unblocking position) of the bolt from the retracted position towards the extended position.

Each of the outer member and the inner member may be arranged to push the arm. For example, when the outer member is rotated in a first direction (e.g. by means of a handle), the outer member may push the arm such that the arm rotates in a direction opposite to the first direction. When the outer member is rotated in a second direction, opposite to the first direction, the outer member may run free from the arm. Conversely, when the inner member is rotated in a first direction (e.g. by means of a handle), the inner member may push the arm such that the arm rotates in a direction opposite to the first direction. When the inner member is rotated in a second direction, opposite to the first direction, the inner member may run free from the arm.

According to a further aspect, there is provided a system comprising a lock device according to the present disclosure and a strike plate for installation in a frame. The system may further comprise an access member, such as a door leaf or window leaf. In this case, the lock device may be arranged in the access member. The system may further comprise a frame. In this case, the strike plate may be arranged in the frame.

The system may further comprise a strike plate magnet provided in the strike plate. In this case, the repulsive magnetic force may be generated between the lock device magnet and the strike plate magnet when the frame is aligned with the strike plate. The strike plate magnet may be a permanent magnet, for example comprising a Neodymium alloy.

The strike plate magnet may be fixed with respect to the strike plate. Thus, no moving parts are required in the strike plate. Thereby, the design is made simple, reliable and cheap.

The strike plate magnet may be integrated in the strike plate. The strike plate magnet may be covered by a strike plate blocking layer, e.g. of plastic material. Alternatively, the strike plate magnet may be exposed to ambient air, e.g. to an air gap between the access member and the frame when the access member is aligned with the frame.

The lock device magnet and the strike plate magnet may be arranged such that respective magnetic poles of the same type are facing each other when the access member is closed in order to generate the opposing or repulsive magnetic force. For example, a north pole of the lock device magnet may be facing a north pole of the strike plate magnet.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
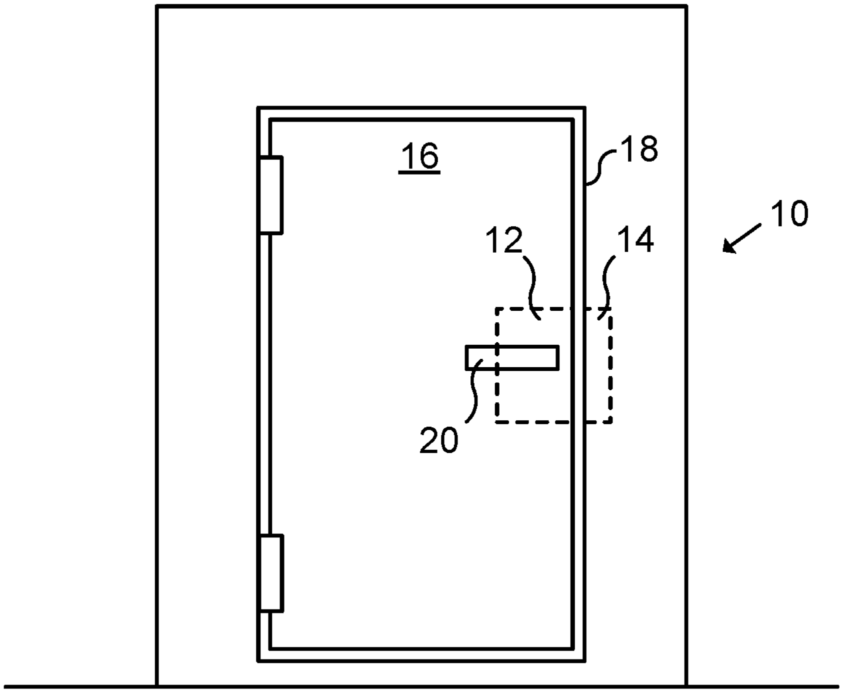
FIG. 1: schematically represents a system comprising a lock device and a strike plate.

In the following, a lock device for installation in an access member movable relative to a frame, and a system comprising a lock device and a strike plate, will be described. The same or similar reference numerals will be used to denote the same or similar structural features.

FIG. 1 schematically represents a system 10 comprising a lock device 12 and a strike plate 14. The lock device 12 is here exemplified as a lock case. The system 10 further comprises an access member 16 and a frame 18.

The access member 16 is here exemplified as a door leaf. The lock device 12 is installed in the access member 16. The access member 16 is movable relative to the frame 18. In FIG. 1, the access member 16 is in a closed position. The strike plate 14 is installed in the frame 18. In the closed position of the access member 16, the lock device 12 faces the frame 18.

The lock device 12 comprises a handle 20, here exemplified as a lever. A further handle (not shown) is arranged on the opposite side of the access member 16. Reading electronics (not shown) for wireless authentication may be arranged in the handle 20. The gap between the access member 16 and the frame 18 (at the side of the lock device 12) may for example be 6-8 mm or less. However, the system 10 as described herein can function with a gap of 12 mm.

Figure 2:
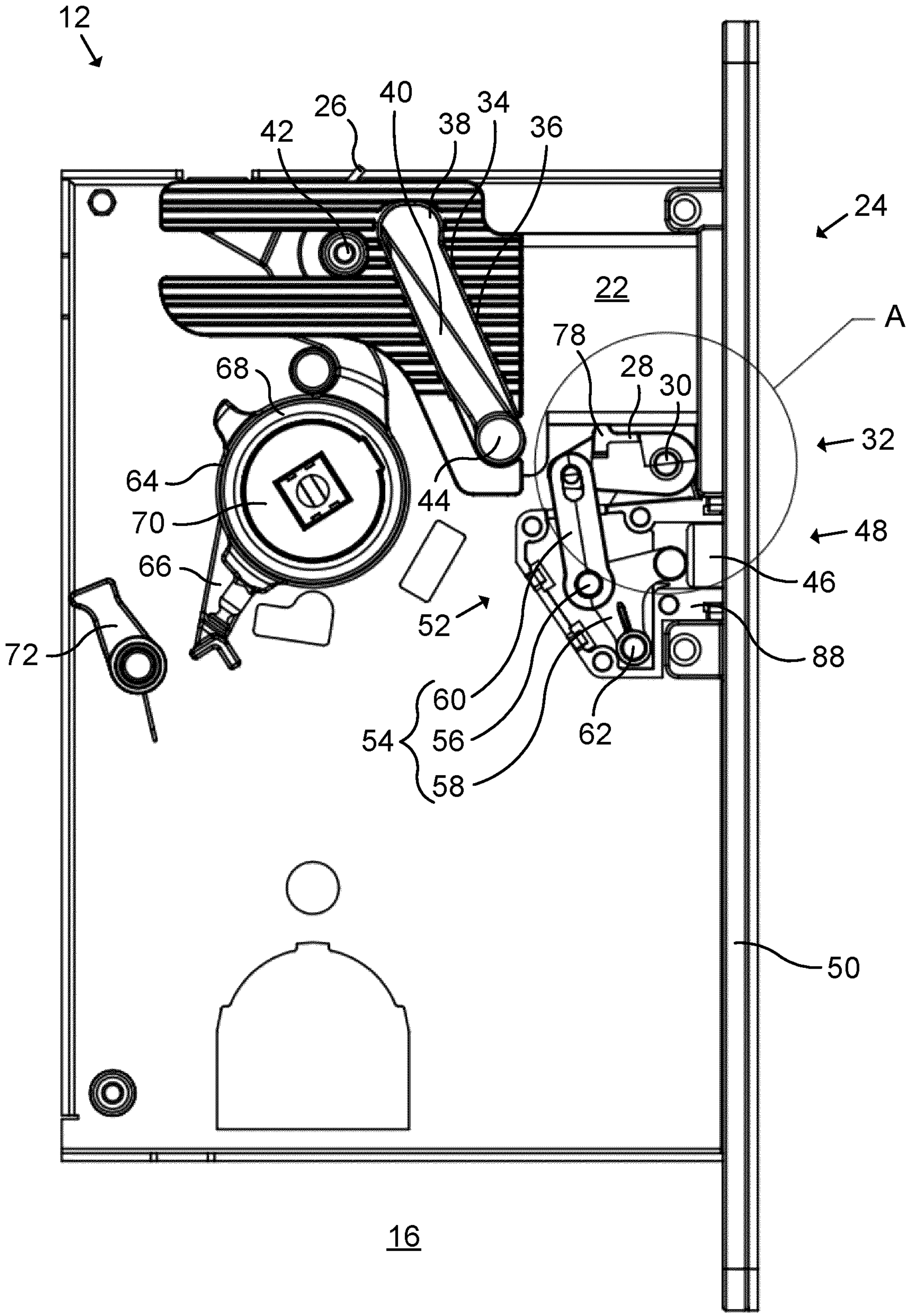
FIG. 2: schematically represents an interior side view of the lock device with a bolt in a retracted position.

FIG. 2 schematically represents an interior side view of the lock device 12 when the access member 16 is in an open position, i.e. not aligned with the frame 18. The lock device 12 comprises a bolt 22. In FIG. 2, the bolt 22 is in a retracted position 24. In the retracted position 24, the bolt 22 is disengaged from the strike plate 14. As shown in FIG. 2, the bolt 22 is entirely accommodated inside the lock device 12 in the retracted position 24. The bolt 22 is movable from the retracted position 24 to an extended position.

The lock device 12 further comprises a bolt force device 26. The bolt force device 26 exerts a force on the bolt 22 from the retracted position 24 towards the extended position, i.e. to the right in FIG. 2. In this example, the bolt force device 26 is a torsion spring.

The lock device 12 further comprises a blocking member 28. In this example, the blocking member 28 is rotatably arranged about a blocking member pivot 30. In FIG. 2, the blocking member 28 is in a blocking position 32. In the blocking position 32, the blocking member 28 blocks movement of the bolt 22 from the retracted position 24 towards the extended position. The blocking member 28 is movable from the blocking position 32 to an unblocking position.

As shown in FIG. 2, the bolt 22 comprises a guiding structure 34. The guiding structure 34 of this example comprises a linear bolt slot 36. The bolt slot 36 is angled (here approximately 30°) with respect to a vertical direction (up/down direction in FIG. 2). A holding recess 38 is formed in an upper end of the bolt slot 36.

The lock device 12 further comprises an arm 40. The arm 40 is rotatably arranged about an arm pivot 42. The arm 40 comprises a guiding member 44. The guiding member 44 is engaged in the guiding structure 34. Thus, the guiding member 44 can travel up and down in the bolt slot 36.

The bolt force device 26 exerts a torque on the arm 40 about the arm pivot 42, in a counterclockwise direction in FIG. 2. In this way, the bolt 22 and the bolt force device 26 are arranged such that in the retracted position 24 of the bolt 22, the bolt 22 is preloaded towards the extended position (to the right in FIG. 2). However, as long as the blocking member 28 adopts the blocking position 32, the blocking member 28 prevents the bolt 22 from moving from the retracted position 24 towards the extended position. The bolt force device 26 may be arranged to force the bolt 22 from the retracted position 24 towards the extended position in alternative ways, e.g. not necessarily via the arm 40.

The lock device 12 further comprises a lock device magnet 46. In FIG. 2, the lock device magnet 46 is in a passive position 48. The lock device magnet 46 is movable from the passive position 48 to an active position, to the left in FIG. 2, in response to a repulsive magnetic force acting on the lock device magnet 46. The lock device magnet 46 is integrated in the lock device 12.

The lock device 12 further comprises a forend 50. In the illustrated passive position 48, the lock device magnet 46 rests against the interior of a plastic housing 88 inserted into the forend 50. The housing 88 also houses the release transmission 52. As an alternative to the housing 88, a portion of the forend 50 adjacent to the lock device magnet 46 may be made of plastic. As shown in FIG. 2, no parts protrude outside the forend 50 (to the right in FIG. 2).

The lock device 12 further comprises a release transmission 52. The release transmission 52 is arranged to mechanically transmit a movement of the lock device magnet 46 from the passive position 48 to the active position, to a movement of the blocking member 28 from the blocking position 32 to the unblocking position. In this way, the bolt 22 can be released.

In this example, the bolt 22 is arranged to move linearly between the retracted position 24 and the extended position. The bolt 22 may be made of metal, for example molded stainless steel.

The release transmission 52 is connected to the blocking member 28 and is arranged to purely mechanically transmit a movement of the lock device magnet 46 from the passive position 48 to the active position, to a movement of the blocking member 28 from the blocking position 32 to the unblocking position.

In this example, the release transmission 52 comprises a linkage. More specifically, the release transmission 52 comprises a knee joint 54 having a knee joint pivot 56, a first link member 58 and a second link member 60. The first link member 58 and the second link member 60 are rigid and interconnected via the knee joint pivot 56. The second link member 60 is coupled to the blocking member 28.

The first link member 58 is rotationally arranged about a first link member pivot 62. A portion of the first link member 58 is in abutting contact with the lock device magnet 46. The lock device magnet 46 is thus arranged to act on the first link member 58 of the knee joint 54 such that a movement of the lock device magnet 46 from the passive position 48 towards the active position (to the left in FIG. 2) causes a rotation of the first link member 58 (counterclockwise in FIG. 2) and a consequential movement of the knee joint pivot 56. A movement direction of the lock device magnet 46 from the passive position 48 towards the active position is substantially aligned with the knee joint pivot 56.

The lock device 12 further comprises a configurable hub 64. The configurable hub 64 is operatively connected to the bolt 22. By means of the configurable hub 64, a locked side and an unlocked side of the lock device 12 can be configured. To this end, the configurable hub 64 comprises an intermediate member 66, an outer member 68, an inner member (not shown) and an attachment element 70. The intermediate member 66 is arranged between the outer member 68 and the inner member. The attachment element 70 can be manually inserted into the intermediate member 66 from either side of the lock device 12. In FIG. 2, the attachment element 70 has been inserted (e.g. by means of legs on the attachment element 70) into the outer member 68 and into the intermediate member 66. Thereby, the outer member 68 rotates together with the intermediate member 66. The inner member on the other hand rotates independently of the outer member 68 and the intermediate member 66.

As shown in FIG. 2, the lock device 12 further comprises a blocking lever 72. The blocking lever 72 is movable between an illustrated unlocked position and a locked position. In the locked position, the blocking lever 72 blocks rotational movement of the intermediate member 66.

The lock device 12 may optionally comprise a key cylinder (not shown) operatively connected to the blocking lever 72. In this case, the lock device 12 can be realized entirely without electronics. Alternatively, the lock device 12 may comprise an electric actuator (not shown) for controlling the blocking lever 72, for example in response to an authorization signal issued in response to a valid authorization, e.g. by presenting a card to the reading electronics.

Figure 3:
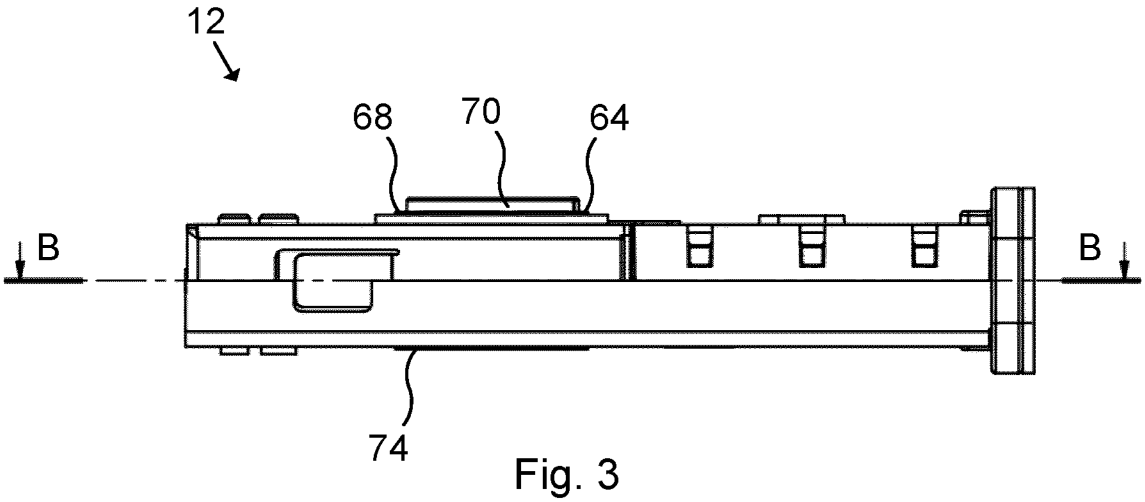
FIG. 3: schematically represents a bottom view of the lock device.

FIG. 3 schematically represents a bottom view of the lock device 12. In FIG. 3, the inner member 74 of the configurable hub 64 can be seen.

Figure 4:
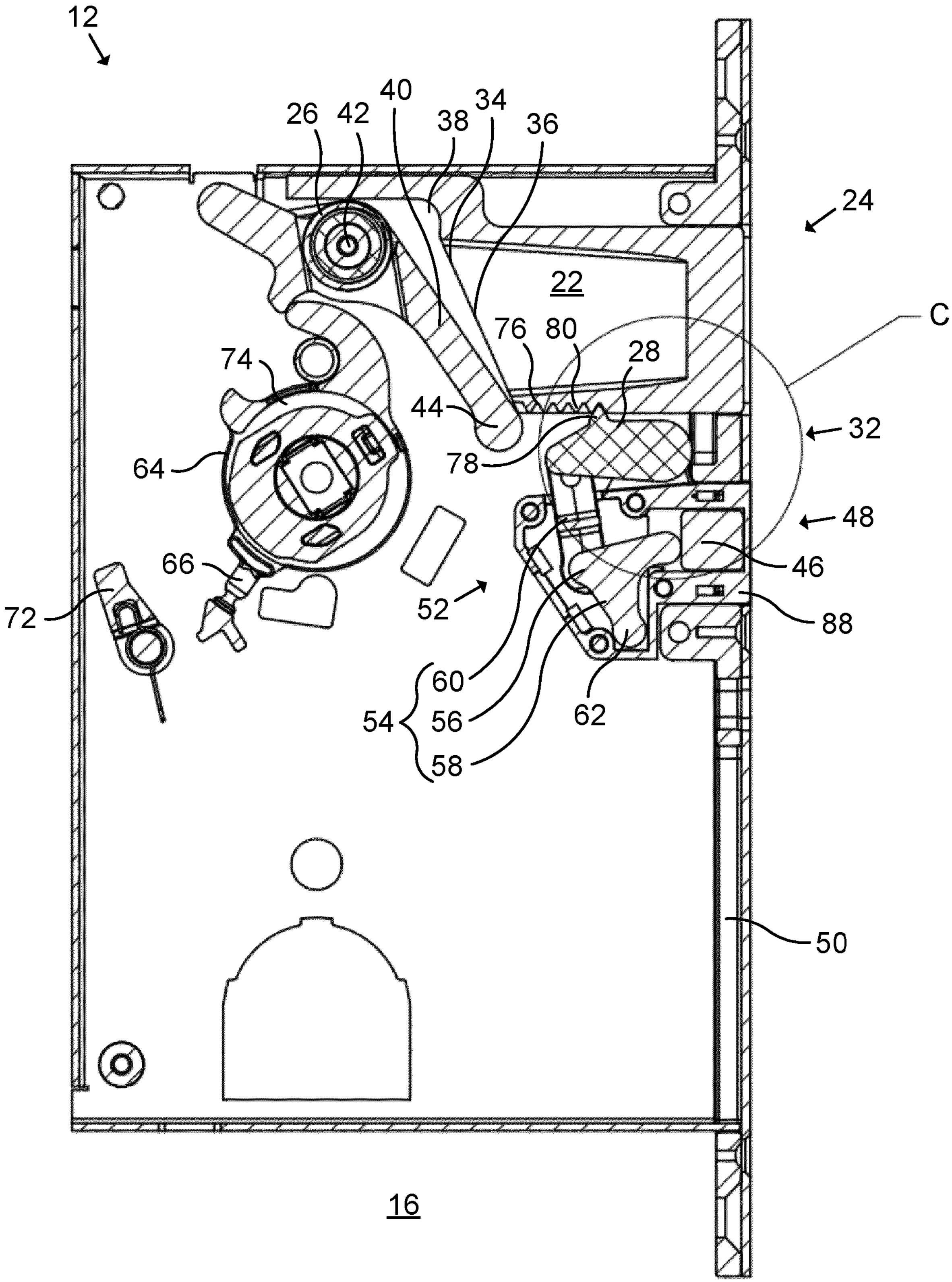
FIG. 4: schematically represents a cross-sectional side view of the lock device along line B-B in FIG. 3.

FIG. 4 schematically represents a cross-sectional side view of the lock device 12 along line B-B in FIG. 3. In FIG. 4, it can be seen that the lock device magnet 46 is covered by an outer side of the housing 88. Furthermore, FIG. 4 shows that the lock device magnet 46 rests against the housing 88 in the passive position 48.

As shown in FIG. 4, the bolt 22 comprises an engageable structure 76. Moreover, the blocking member 28 comprises an engaging structure 78. The engaging structure 78 is arranged to engage the engageable structure 76 in the blocking position 32 of the blocking member 28. By means of this engagement, the bolt 22 is prevented from being released. In this example, the engaging structure 78 is realized as a notch and the engageable structure 76 is realized as a plurality of teeth 80. The engaging structure 78 and the engageable structure 76 thereby form a ratchet mechanism which, when the blocking member 28 adopts the blocking position 32, prevents the bolt 22 from moving from the retracted position 24 towards the extended position, but allows the bolt 22 from the extended position to the retracted position 24. The ratchet mechanism thus allows the bolt 22 to be retracted, e.g. by turning the handle 20, when the access member 16 is open and the blocking member 28 adopts the blocking position 32.

Figure 5:
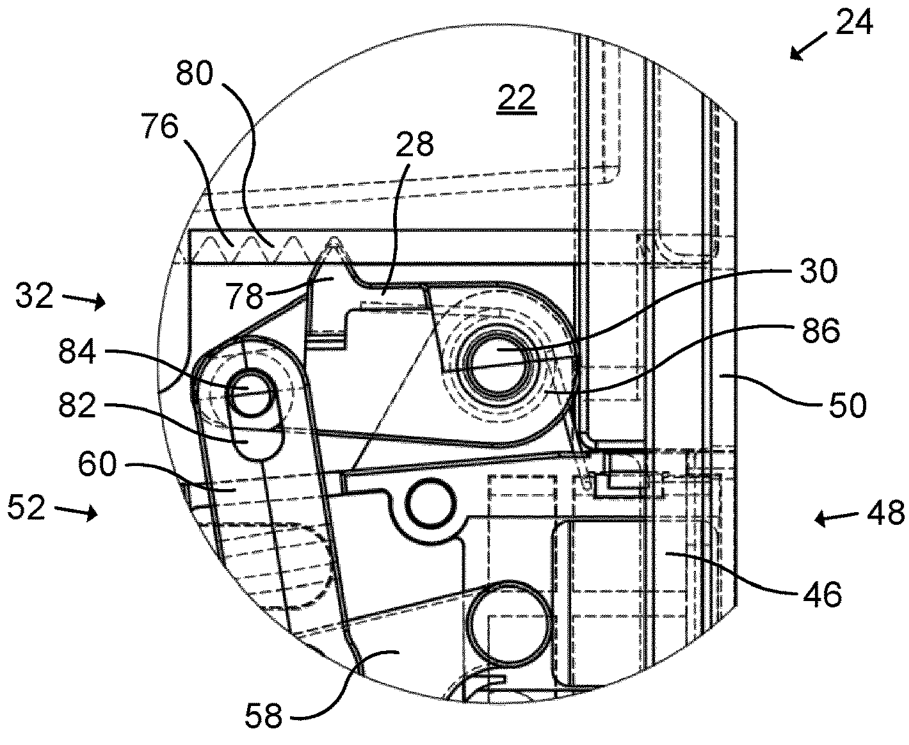
FIG. 5: schematically represents an enlarged view of section A in FIG. 2.

FIG. 5 schematically represents an enlarged view of section A in FIG. 2. As shown in FIG. 5, the second link member 60 comprises a second link member slot 82. The blocking member 28 comprises a pin 84 engaged in the second link member slot 82. The blocking member 28 is allowed to move (rotate counterclockwise in FIG. 5) such that the pin 84 travels downwards in the second link member slot 82. In this way, the bolt 22 is allowed to be retracted such that the teeth 80 slide over the engaging structure 78 when the blocking member 28 adopts the blocking position 32.

As shown in FIG. 5, the lock device 12 further comprises a blocking member force device 86, here exemplified as a torsion spring. The blocking member force device 86 is arranged to force the blocking member 28 against the bolt 22. The blocking member force device 86 forces the blocking member 28 to rotate (in a clockwise direction in FIG. 5) about the blocking member pivot 30.

When the blocking member 28 is forced from the unblocking position to the blocking position 32 by means of the blocking member force device 86, the blocking member 28 rotates (in the clockwise direction in FIG. 5) about the blocking member pivot 30. This rotation of the blocking member 28 causes the second link member 60 to be pulled upwards (by the engagement of the pin 84 in the second link member slot 82), the first link member 58 to rotate (in the clockwise direction in FIG. 5) about the first link member pivot 62 to push the lock device magnet 46 from the active position back to the passive position 48.

With collective reference to FIGS. 2 and 5, when the lock device magnet 46 is in the passive position 48, an angle between the first link member 58 and the second link member 60 is approximately 20°. Thus, an angle between a first line, between the first link member pivot 62 and the knee joint pivot 56, and a second line, between the knee joint pivot 56 and the pin 84, is approximately 20°. A movement direction of the lock device magnet 46 from the passive position 48 towards the active position is directed between the first link member pivot 62 and the pin 84.

Figure 6:
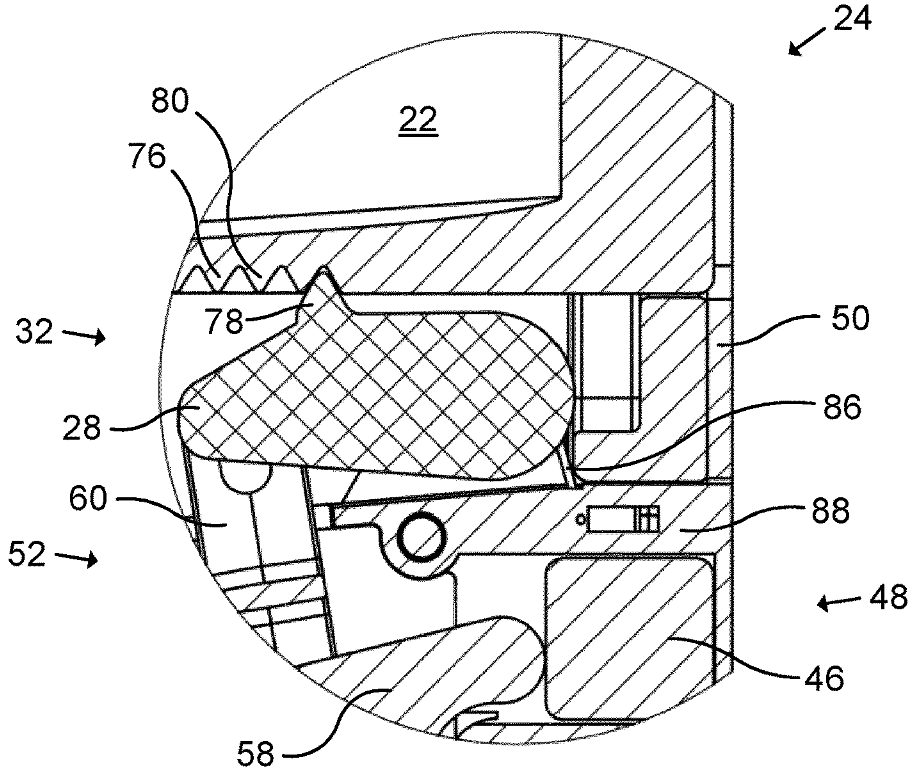
FIG. 6: schematically represents an enlarged view of section C in FIG. 4.

FIG. 6 schematically represents an enlarged view of section C in FIG. 4. As shown in FIG. 6, the housing 88 accommodates the lock device magnet 46 in a cylindrical portion thereof. The lock device magnet 46 thereby moves linearly like a piston from the passive position 48 to the active position (to the left in FIG. 6). In this example, an outer side of the housing 88 (to the right in FIG. 6) is flush with an outer side of the forend 50 (to the right in FIG. 6). Also the release transmission 52 is contained within the housing 88. The second link member 60 partly protrudes out from the housing 88. The housing 88 may be made of any non-magnetic material. A thickness of the housing 88 may be approximately 1 mm.

Figure 7:
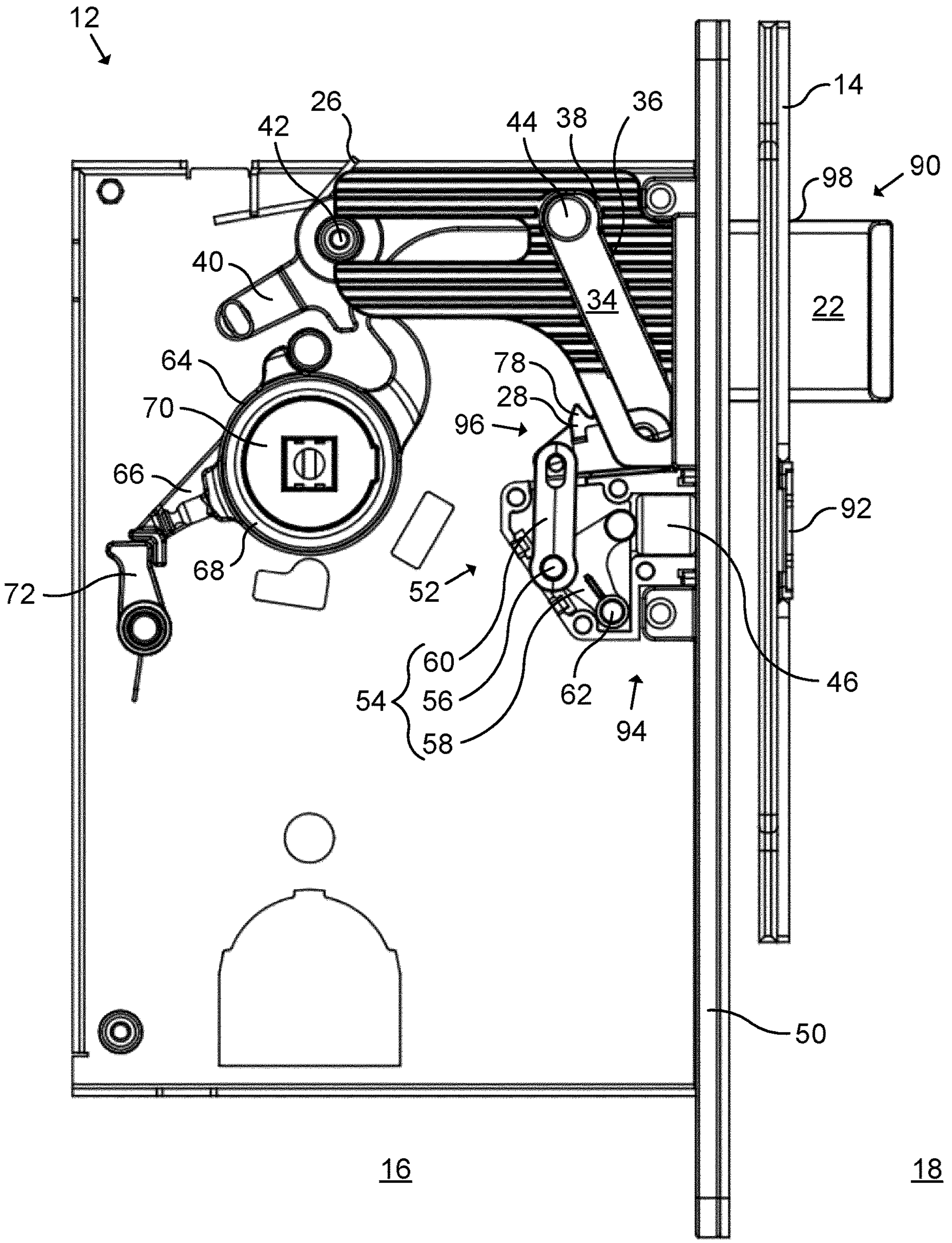
FIG. 7: schematically represents an interior side view of the lock device with the bolt in an extended position.

FIG. 7 schematically represents an interior side view of the lock device 12 with the bolt 22 in the extended position 90. As shown in FIG. 7, a strike plate magnet 92 is arranged in the strike plate 14. The strike plate magnet 92 is fixed with respect to the strike plate 14. Thus, the strike plate 14 does not contain any moving parts. In this example, the strike plate magnet 92 is embedded in the strike plate 14 and is covered by a plastic layer of the strike plate 14.

In the following, the function of the lock device 12 when closing the access member 16 will be described. Slightly before the access member 16 becomes aligned with the frame 18, the proximity of the lock device magnet 46 to the strike plate magnet 92 causes the respective magnetic fields of the lock device magnet 46 and the strike plate magnet 92 to combine to generate a repulsive magnetic force. Since the strike plate magnet 92 is fixed, the repulsive magnetic force causes the lock device magnet 46 to be repelled, i.e. pushed to the left in FIG. 7. Eventually, the repulsive magnetic force causes the lock device magnet 46 to move from the passive position 48 to the active position 94.

The release transmission 52 mechanically transmits the movement of the lock device magnet 46 from the passive position 48 to the active position 94 to a movement of the blocking member 28 from the blocking position 32 to the unblocking position 96. In the unblocking position 96, movements of the bolt 22 from the retracted position 24 towards the extended position 90 is not blocked by the blocking member 28. Thus, in the unblocking position 96, the blocking member 28 is disengaged from the bolt 22. As soon as the blocking member 28 moves from the blocking position 32 to the unblocking position 96, the bolt force device 26 forces the bolt 22 away from the retracted position 24, i.e. to the right in FIG. 7 through the forend 50. Thus, the lock device 12 automatically releases the bolt 22 when the access member 16 comes close to the frame 18 such that the lock device magnet 46 is in proximity of the strike plate magnet 92.

If the access member 16 is not yet aligned with the frame 18, the bolt 22 will be pushed against the front of the strike plate 14, next to a strike opening 98. The lock device 12 thus enables release of the bolt 22 to be triggered slightly before the access member 16 becomes aligned with the frame 18. When the access member 16 becomes aligned with the frame 18, the bolt 22 will be pushed further away from the retracted position 24 and into the extended position 90 illustrated in FIG. 7 where the bolt 22 protrudes into the strike opening 98 and thereby engages the strike plate 14. The bolt 22 is thus automatically released into engagement with the strike plate 14 purely by means of mechanic and magnetic action, without needing any electronics and without needing to maneuver a handle.

Furthermore, in addition to the movements of the bolt 22 and the access member 16, no parts outside the lock device 12 or in the strike plate 14 move. The lock device 12 thereby generates less sound in comparison with the prior art. In this example, the only part that protrudingly engages the strike plate 14 is the bolt 22. Only magnetic cooperation between the strike plate magnet 92 and the lock device magnet 46 is required to release the bolt 22. In the closed position of the access member 16, magnetic poles of the same type of the lock device magnet 46 and the strike plate magnet 92 are facing each other.

No mechanical cooperation with the strike plate 14, such as pins, are needed for releasing the bolt 22. Such solutions would require tight tolerances in the assembly, e.g. an accurate positioning between the lock device 12 and the strike plate 14.

In this example, when the lock device magnet 46 moves from the passive position 48 to the active position 94, the lock device magnet 46 pushes the first link member 58. The first link member 58 is thereby caused to rotate (in the counterclockwise direction in FIG. 7) about the first link member pivot 62.

Due to this rotation of the first link member 58, the second link member 60 is pulled downwards in FIG. 7 by means of the connection to the first link member 58 via the knee joint pivot 56. As shown in FIG. 7, these movements of the first link member 58 and the second link member 60 cause the angle between the first link member 58 and the second link member 60 to become more acute.

The movement of the second link member 60 in turn pulls the blocking member 28 to rotate about the blocking member pivot 30 from the blocking position 32 to the unblocking position 96 by means of the engagement between the second link member slot 82 and the pin 84. When the blocking member 28 moves from the blocking position 32 to the unblocking position 96, the engaging structure 78 in the blocking member 28 is released from the engageable structure 76 in the bolt 22. The bolt 22 is thereby released.

When the bolt 22 is released, the torque exerted on the arm 40 by means of the bolt force device 26 causes the arm 40 to rotate (in the counterclockwise direction in FIG. 7) about the arm pivot 42. This rotation of the arm 40 causes the guiding member 44 to travel in the bolt slot 36 from the lower end to the upper end. This engagement between the guiding member 44 and the bolt slot 36 causes the bolt 22 to be pushed from the retracted position 24 towards the extended position 90.

When the access member 16 is closed, the blocking lever 72 is moved to the locked position where the blocking lever 72 blocks the intermediate member 66, as illustrated in FIG. 7. The bolt 22 is thereby locked in the extended position 90, i.e. the bolt 22 cannot be retracted by moving the handle 20. The blocking lever 72 may be moved to the locked position after a certain time from an authorization request has been granted. Alternatively, the lock device 12 may comprise a sensor for sensing when the access member 16 is aligned with the frame 18. The sensor may for example be a sensing latch or a sensing wheel (not shown). Such sensing latch may be depressed into the lock device 12 by the strike plate 14 when the access member 16 is aligned with the frame 18. Thus, the sensing latch does not have to protrudingly engage with the strike plate 14. The lock device 12 can thereby be made more silent since there is no latch crashing into the strike plate 14. The sensing latch may be forced out from the lock device 12 with a very low spring load. In response to a signal from the sensor indicating that the access member 16 is closed, the blocking lever 72 can be driven from the unlocked position to the locked position. The lock device 12 may further comprise a privacy thumbturn (not shown) for locking the bolt 22 in the extended position 90.

Since the strike plate magnet 92 is fixed to the strike plate 14, in contrast to a strike plate magnet moving with respect to a strike plate, the system 10 is made simpler and more reliable. In addition, the system 10 can easily replace an existing set of lock case and strike plate, e.g. by fastening a strike plate magnet 92 to the strike plate 14 and replacing an existing lock case with the lock device 12.

The reading electronics, e.g. in the handle 20, may be arranged to communicate wirelessly with an external device, such as a mobile phone. The wireless communication may for example be carried out by means of BLE (Bluetooth Low Energy) or RFID (Radio Frequency Identification). As an alternative to wireless communication, a user may input a code to the reading electronics, for example via a keypad.

Furthermore, as shown in FIG. 7, the guiding member 44 engages the holding recess 38 when the bolt 22 adopts the extended position 90. By means of this engagement, the bolt 22 is prevented from being manipulated from the extended position 90 to the retracted position 24.

In order to open the access member 16 from the outer side shown in FIG. 7, the blocking lever 72 first has to be moved from the illustrated locked position to the unlocked position. This is because the intermediate member 66 is coupled to the outer member 68 by means of the attachment element 70 of the configurable hub 64.

If an authorization request is denied, the blocking lever 72 is not switched, i.e. remains in the locked state. If the authorization request is granted, e.g. upon presenting a valid credential, the blocking lever 72 is driven (e.g. by means of an electromechanical actuator) from the locked state to the unlocked state. As an alternative to the reading electronics, the intermediate member 66 can be unlocked by means of a key cylinder.

When the blocking lever 72 adopts the unlocked position and the handle 20 is turned, the outer member 68, the intermediate member 66 and the attachment element 70 are rotated (counterclockwise in FIG. 7). The outer member 68 then pushes the arm 40 such that the arm 40 rotates about the arm pivot 42 (clockwise in FIG. 7). The rotation of the arm 40 causes the guiding member 44 to travel down in the bolt slot 36. As the guiding member 44 travels downwards in the bolt slot 36, the bolt 22 is caused to move from the extended position 90 back to the retracted position 24.

When the access member 16 is opened, the lock device magnet 46 becomes more and more distant from the strike plate magnet 92 and the repulsive magnetic force between the lock device magnet 46 and the strike plate magnet 92 acting on the lock device magnet 46 will be more and more reduced. Eventually, the force on the lock device magnet 46 generated by the blocking member force device 86 will overcome the repulsive magnetic force. The blocking member force device 86 will then force the blocking member 28 from the unblocking position 96 back to the blocking position 32. This movement of the blocking member 28 will be mechanically transferred by the release transmission 52 to a movement of the lock device magnet 46 from the active position 94 back to the passive position 48.

In this example, the blocking member force device 86 will force the blocking member 28 to rotate about the blocking member pivot 30 (in the clockwise direction in FIG. 7) from the unblocking position 96 to the blocking position 32. This rotation of the blocking member 28 will pull the second link member 60 upwards by means of the engagement between the pin 84 and the second link member slot 82. This movement of the second link member 60 will cause the first link member 58 to rotate (in the clockwise direction in FIG. 7) about the first link member pivot 62 by means of the engagement between the second link member 60 and the first link member 58 in the knee joint pivot 56. This rotation of the first link member 58 will cause the first link member 58 to push the lock device magnet 46 from the active position 94 back to the passive position 48. The lock device magnet 46 will thereby move from the active position 94 back to the passive position 48

In order to open the access member 16 from the inner side, an inner handle may be turned. Since the inner member 74 is not coupled to the intermediate member 66, the inner member 74 can be rotated regardless of the state adopted by the blocking lever 72. When the inner handle is turned, the inner member 74 rotates (in the counterclockwise direction in FIG. 7). The inner member 74 then pushes the arm 40 such that the arm 40 rotates about the arm pivot 42 (clockwise in FIG. 7). The kinematic chain from the arm 40 to the bolt 22 is then the same as for the outer member 68.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. A lock device for installation in an access member movable relative to a frame, the lock device comprising:

a bolt movable between a retracted position for disengagement from a strike plate in the frame, and an extended position for engagement with the strike plate;

a bolt force device arranged to force the bolt from the retracted position towards the extended position;

a blocking member movable between a blocking position where movement of the bolt from the retracted position towards the extended position is blocked by the blocking member, and an unblocking position where movement of the bolt from the retracted position towards the extended position is not blocked by the blocking member;

a lock device magnet movable between a passive and an active position in response to a repulsive magnetic force acting on the lock device magnet; and a release transmission, movable relative to at least one of the lock device magnet or the blocking member, arranged to mechanically transmit a movement of the lock device magnet from the passive position to the active position, to a movement of the blocking member from the blocking position to the unblocking position, by directly moving the blocking member from the blocking position to the unblocking position as the lock device magnet moves from the passive position to the active position.

2. The lock device according to claim 1, wherein the bolt is arranged to move substantially linearly between the retracted position and the extended position.

3. The lock device according to claim 1, further comprising a blocking member pivot, wherein the blocking member is rotatably connected to the blocking member pivot for rotation between the blocking position and the unblocking position.

4. The lock device according to claim 1, further comprising a blocking member force device arranged to force the blocking member against the bolt for blocking the bolt.

5. The lock device according to claim 4, wherein the bolt comprises an engageable structure, and wherein the blocking member comprises an engaging structure arranged to engage the engageable structure for blocking the bolt.

6. The lock device according to claim 5, wherein the engageable structure comprises teeth.

7. The lock device according to claim 1, further comprising a configurable hub operatively connected to the bolt, the configurable hub being arranged to configure a locked side and an unlocked side of the lock device.

8. The lock device according to claim 7, wherein the configurable hub comprises an intermediate member, an outer member, an inner member and an attachment element selectively attachable to the intermediate member from either side of the lock device through either the outer member or the inner member to configure the locked side and the unlocked side of the lock device.

9. The lock device according to claim 8, wherein each of the outer member and the inner member is arranged to push the arm.

10. The lock device according to claim 1, further comprising an arm having a guiding member, wherein the bolt comprises a guiding structure, and wherein the guiding member is arranged to travel in the guiding structure such that a movement of the arm generates a movement of the bolt.

11. The lock device according to claim 10, wherein the bolt force device is arranged to exert a torque on the arm.

12. A system comprising a lock device according to claim 1 and a strike plate for installation in a frame.

13. The system according to claim 12, further comprising a strike plate magnet provided in the strike plate, wherein the repulsive magnetic force is generated between the lock device magnet and the strike plate magnet when the frame is aligned with the strike plate.

14. The system according to claim 13, wherein the strike plate magnet is fixed with respect to the strike plate.

15. A lock device for installation in an access member movable relative to a frame, the lock device comprising:

a bolt movable between a retracted position for disengagement from a strike plate in the frame, and an extended position for engagement with the strike plate;

a bolt force device arranged to force the bolt from the retracted position towards the extended position;

a blocking member movable between a blocking position where movement of the bolt from the retracted position towards the extended position is blocked by the blocking member, and an unblocking position where movement of the bolt from the retracted position towards the extended position is not blocked by the blocking member;

a lock device magnet movable between a passive and an active position in response to a repulsive magnetic force acting on the lock device magnet; and a release transmission arranged to mechanically transmit a movement of the lock device magnet from the passive position to the active position, to a movement of the blocking member from the blocking position to the unblocking position;

wherein the release transmission comprises a knee joint having a knee joint pivot, and a first link member and a second link member interconnected via the knee joint pivot and moveable relative to one another about the knee joint pivot, and wherein the lock device magnet is arranged to act on the knee joint such that movement of the lock device magnet from the passive position to the active position causes a movement of the knee joint pivot.

16. A lock device for installation in an access member movable relative to a frame, the lock device comprising:

a bolt movable between a retracted position for disengagement from a strike plate in the frame, and an extended position for engagement with the strike plate;

a bolt force device arranged to force the bolt from the retracted position towards the extended position;

a blocking member movable between a blocking position where movement of the bolt from the retracted position towards the extended position is blocked by contact with the blocking member, and an unblocking position where the blocking member is separated from the bolt and movement of the bolt from the retracted position towards the extended position is not blocked by the blocking member;

a lock device magnet movable, in a strictly linear motion, between a passive position and an active position in response to a repulsive magnetic force acting on the lock device magnet; and a release transmission arranged to mechanically transmit a movement of the lock device magnet from the passive position to the active position, to a movement of the blocking member from the blocking position to the unblocking position.

* * * * *